Dec. 9, 1941.          H. W. PRICE                2,265,546
                         BRAKE
                   Filed June 17, 1938        4 Sheets-Sheet 3

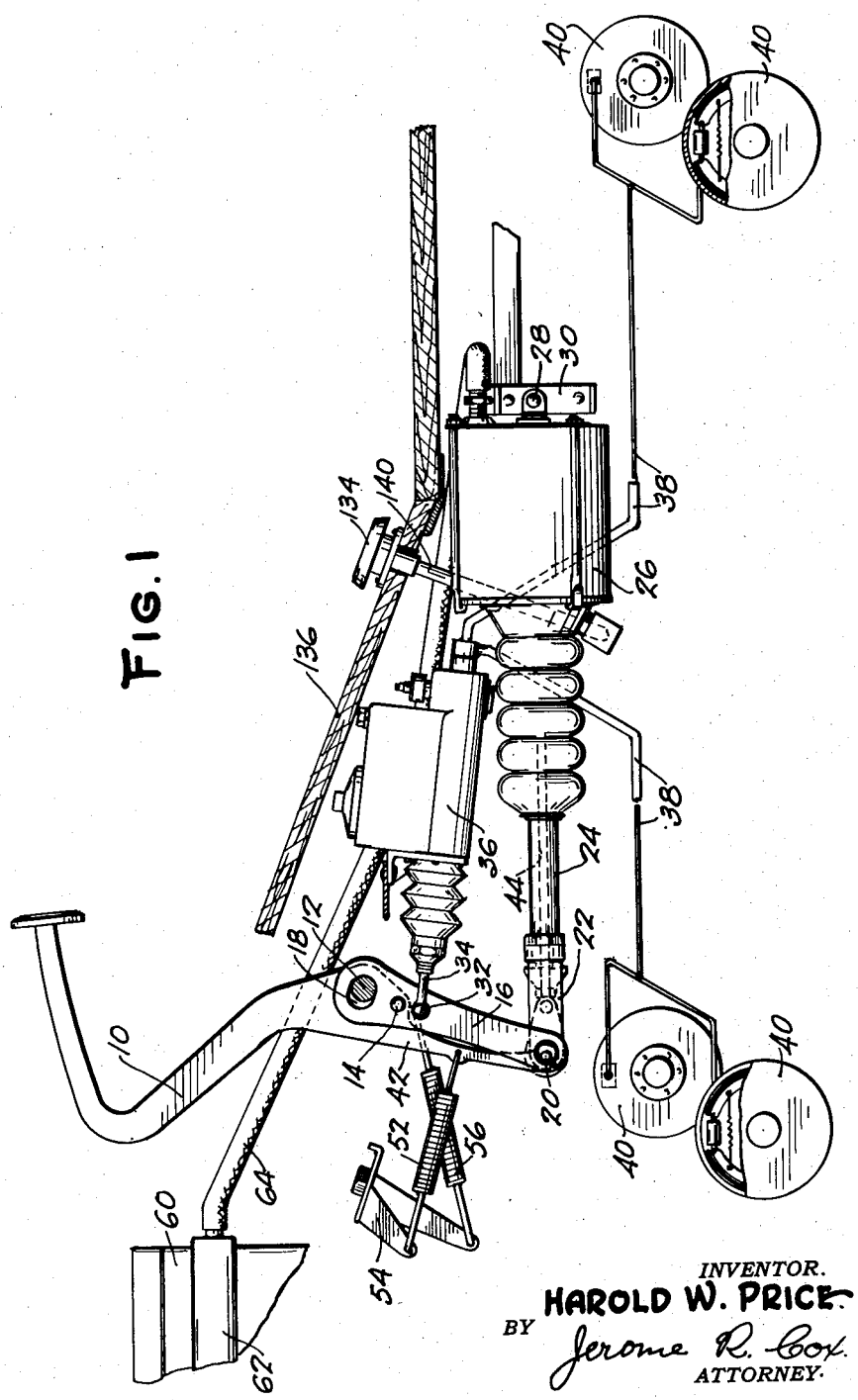

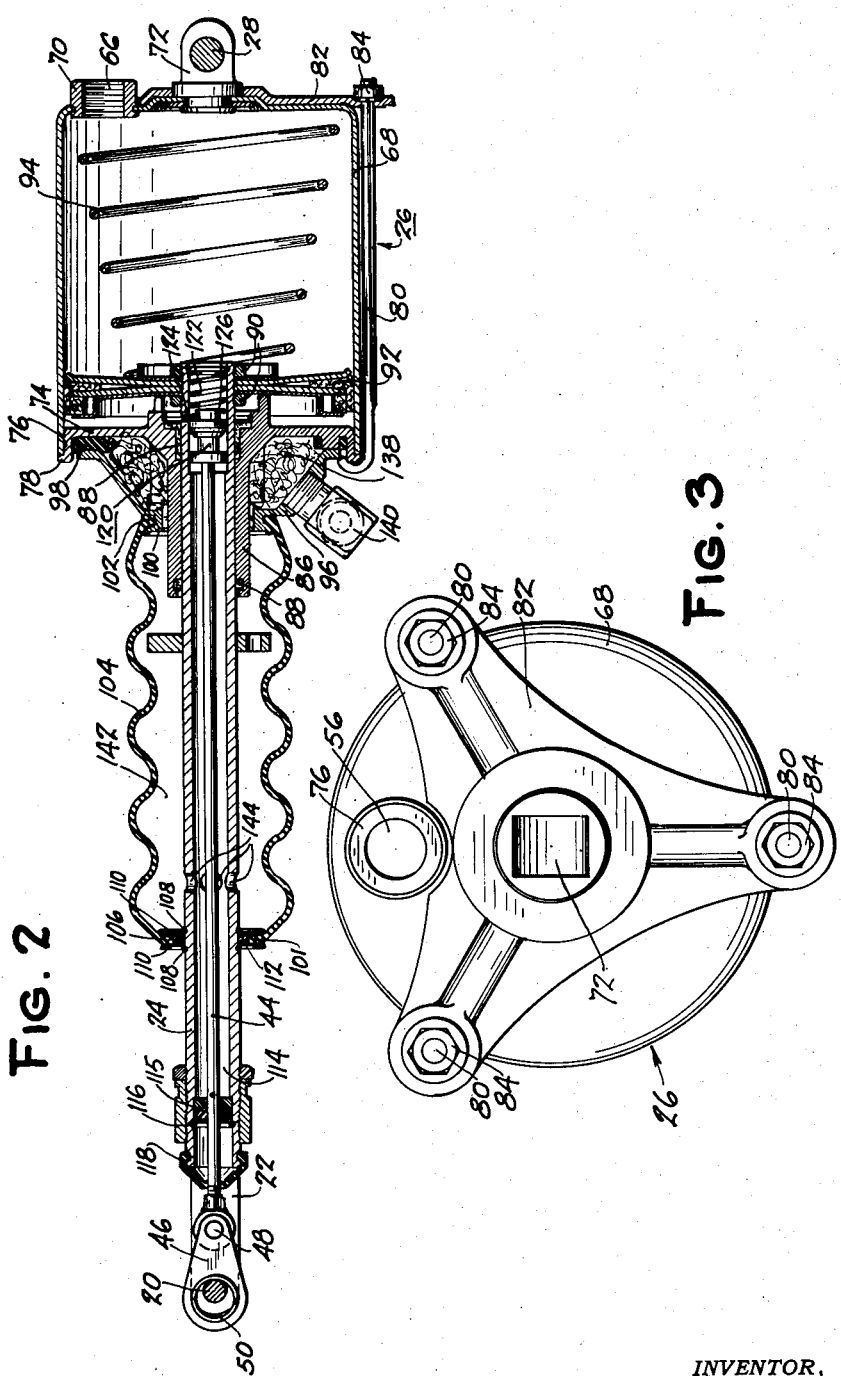

INVENTOR.
HAROLD H. PRICE
BY Jerome R. Cox.
ATTORNEY.

Dec. 9, 1941.    H. W. PRICE    2,265,546
BRAKE
Filed June 17, 1938    4 Sheets-Sheet 4

INVENTOR.
HAROLD W. PRICE
BY Jerome R. Cox
ATTORNEY.

Patented Dec. 9, 1941

2,265,546

UNITED STATES PATENT OFFICE 2,265,546

BRAKE

Harold W. Price, South Bend, Ind., assignor to Bendix Products Corporation, South Bend, Ind., a corporation of Indiana Application June 17, 1938, Serial No. 214,236

6 Claims. (Cl. 188—152)

This invention relates to brakes and more particularly to improvements in internal valve, vacuum operated power cylinders and reaction hookups for operating brakes.

An object of the invention is to provide such a cylinder which can be mounted in an exposed position on the under side of a vehicle without danger that it will accumulate foreign material therein and become inoperative.

Another object is to provide a novel and effective method of securing and sealing an end of a boot of rubber or the like.

Still another object is to provide effective means for securing a head in such a cylinder.

Another object is to provide a novel reactive hookup with an internal valve cylinder.

The above and other objects and desirable particular constructions will become apparent upon reference to the following detailed description of certain embodiments of my invention shown in the accompanying drawings, in which:

Figure 1 is a diagrammatic view of my novel hookup and cylinder;

Figure 2 is a longitudinal sectional view showing a preferred embodiment of my novel cylinder;

Figure 3 is an end view on a larger scale of the cylinder of Figure 2;

Figure 4:
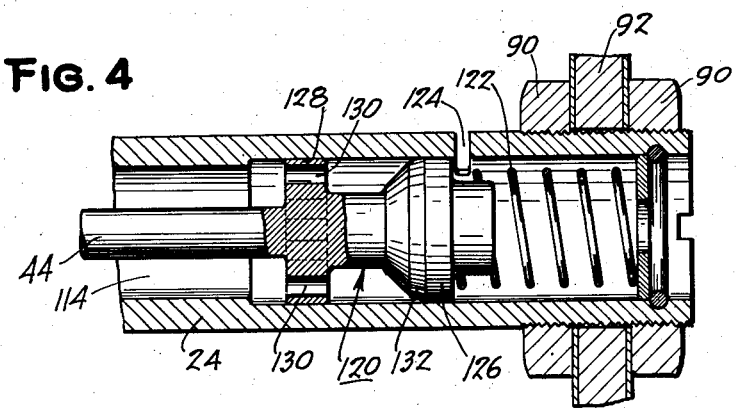
Figures 4, 5 and 6 are diagrams showing the operation of the valves of my novel cylinder.

Referring to Figure 1 there is shown a brake pedal 10 pivoted at 12 on a fixed portion of the vehicle chassis. Pivoted on the pedal at 14 is a power lever 16 provided at one end with a slot 18 surrounding the pedal pivot 12 to provide lost motion between the pedal and the lever and secured at its other end by a pivot 20 to a clevis 22 threadedly secured to the forward end of the piston rod 24 of my novel power cylinder 26. The power cylinder 26 is swingably supported at its rearward end by a pivot 28 secured to a bracket 30 on the vehicle chassis.

Pivoted to the power lever at 32 is a piston rod 34 of a standard master cylinder 36 mounted on a fixed part of the chassis and adapted upon rearward motion of the piston rod to supply fluid under pressure through conduits 38 to brakes 40 to apply them.

The pedal 10 has secured thereto or integrally formed therewith, a valve lever 42 which substantially parallels the power lever 16 and extends between furcations of the lower part of said lever 16 to pivotally engage a valve rod 44 positioned concentrically in the piston rod 24.

This engagement is accomplished through a link 46 (see Figure 2) pivoted on the end of the valve rod at 48 and having at its other end a long sleeve 50 surrounding the pivot pin 20 to provide lost motion and which sleeve is received in a journal formed in the end of said valve lever.

A coil spring 52 is connected between a bracket 54 and the valve lever 42 to hold it and the pedal in released position and a similar spring 56 is secured to the power lever 16 at the pivot 32 and serves to hold it and the master cylinder piston rod 34 in released position.

The vehicle has the usual internal combustion engine 60 with an induction pipe or intake manifold 62 which provides a source of vacuum connected by a conduit 64 to a port 66 (see Figure 2) in the rearward end of the cylinder 26.

Referring now to Figure 2, my novel cylinder comprises a cup-shaped stamping 68 provided at its closed end with an internally threaded fitting 70 which forms the vacuum port 66 and a centrally positioned bracket 72 receiving the pivot pin 28.

The other end of the stamping 68 is closed by a die-cast head 74 secured therein by novel means. The head is formed with a cylindrical portion 76 fitting closely within the end of the cup and a narrow radial flange 78 fitting against the end of the cup wall, and this flange is held securely against the end of the cup by means of a plurality of hook-bolts 80, the threaded ends of which pass through ears of a stamped spider 82 (see Figure 3) resting against the closed end of the cylinder and are there secured by nuts 84.

The head 74 is provided with an integral bearing sleeve 86 through which the piston rod projects into the cylinder. Suitable sealing devices 88 are provided in this sleeve for sealing against leakage of air past the piston rod.

The inner end of the piston rod is threaded and has secured thereto by means of nuts 90, a piston 92. The piston 92 is urged toward the left or brake released position by means of a tapered coil spring 94.

Secured to the outer face of the cylinder head 74 by means of screws or the like is a die-cast cover member 96. A heavy rubber gasket 98 provides a seal between the cover and the head. The cover is formed with an annular groove 100 around which is stretched a thickened annular end 102 of a bellows-like boot 104 of rubber or similar material, and the other end 106 of the boot is secured by novel means to the piston rod 24.

This means comprises a pair of spaced snap rings 108 seated in grooves in the piston rod and having positioned between them a pair of flat thin steel washers 110. Between the washers is compressed a heavy rubber washer 112 of somewhat less diameter than the steel washers and which fits tightly to the piston rod. The end 101 of the boot is stretched over one of the steel washers 110 and seated in the resulting groove formed by the two steel washers 110, and the rubber washer 112.

The piston rod 24 is formed with a bore 114 which is enlarged at its forward end to form a shoulder against which a seal 115 for sealing the valve rod 44 is secured by means of a snap ring 116. Further sealing is provided by an annular boot 118 of resilient material having one end stretched around the rod 44 and the other end stretched around a groove on the outer surface of the end of the piston rod 24.

The rear end of the bore 114 is enlarged to form a valve chamber containing a spool-shaped valve member 120 connected to the valve rod 44 and urged toward the left or "off" position by a coil spring 122.

A port 124 provides communication between the space forward of the piston 92 and the valve chamber and one flange 126 of the valve member 120 is adapted to be moved forwardly or rearwardly of this port to admit vacuum from the rearward side of the piston 92 or air from the forward end of the piston rod bore 114 to said space. The other flange 128 of the spool valve member 120 merely acts as a guide and is perforated by an annular row of holes 130 to permit free flow of air thereby.

Figure 5:
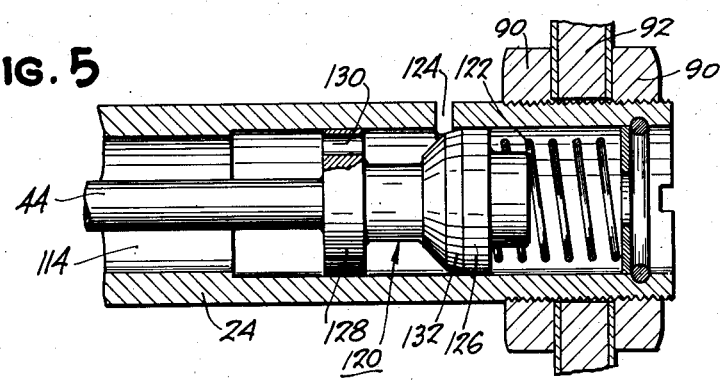

I prefer to form the valve flange 126 with a slightly tapered portion 132 to provide a metering effect on the air side; see Figure 5.

Air is admitted to the forward side of the valve from an air cleaner 134 (see Figure 1) positioned above the floor boards 136 of the motor vehicle and communicating with the space 138 between the cylinder head 74 and the cover member 96 by means of a tube 140. Air filtering material may also be placed in the space 138.

The air passes from the space 138 to the space 142 between the boot 104 and the piston rod 24 from which it enters the bore 114 in the piston rod through a series of openings 144 arranged so that they are forward of the bearing sleeve 86 when the piston is in its rearmost position.

Figures 1, 2 and 4 show the parts of my novel cylinder and hookup in their brake released position. In this position vacuum, admitted to the rear of the cylinder by the part 56, passes to the front of the piston 92 through the port 124 and the pressures of the piston are therefore substantially balanced and the piston remains forward under the influence of the spring 94. In operation, the pedal 10 is depressed. The lost motion between the power lever 16 and the pivot 12 permits the pedal to move and swing the valve lever 42 in a counterclockwise direction without applying the brakes. The valve rod 44 is therefore moved toward the rear and the flange 126 of the valve member 120 is moved first to cut off the port 124 and then to open it to the air in the piston rod shown in Figure 5. The air flows into the space forward of the piston 92 through this port and forces the piston rearwardly. The rearward movement of the piston moves the power lever 16 in a counterclockwise direction tending to force the piston rod 34 of the master cylinder 36 rearward to apply the brakes, and at the same time, through the pivot 14 force the pedal upwardly with a greatly reduced force proportionate to the force exerted by the power cylinder in the ratio of the distance between pivot 20 and pivot 32 and pivot 14 and pivot 32.

Figure 6:
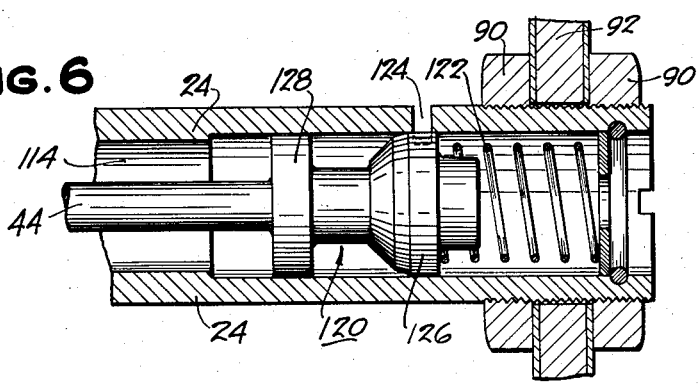

If the operator ceases to depress the pedal 10 it will be seen that the piston 92 and the piston rod 24 will continue moving to the rear long enough to bring the valve to the position shown in Figure 6 (known as a lapped position) whereupon the piston ceases to move.

A slight release of the pedal will bring the valve to the position of Figure 4 and the piston will follow the valve forwardly just as it follows it rearwardly until the brakes are fully released.

It will be noted that my novel hookup is compact and simple and that it provides an accurately proportioned followup and reaction.

It will also be noted that my novel construction efficiently prevents ingress of foreign matter to the interior of the cylinder.

Figure 7:
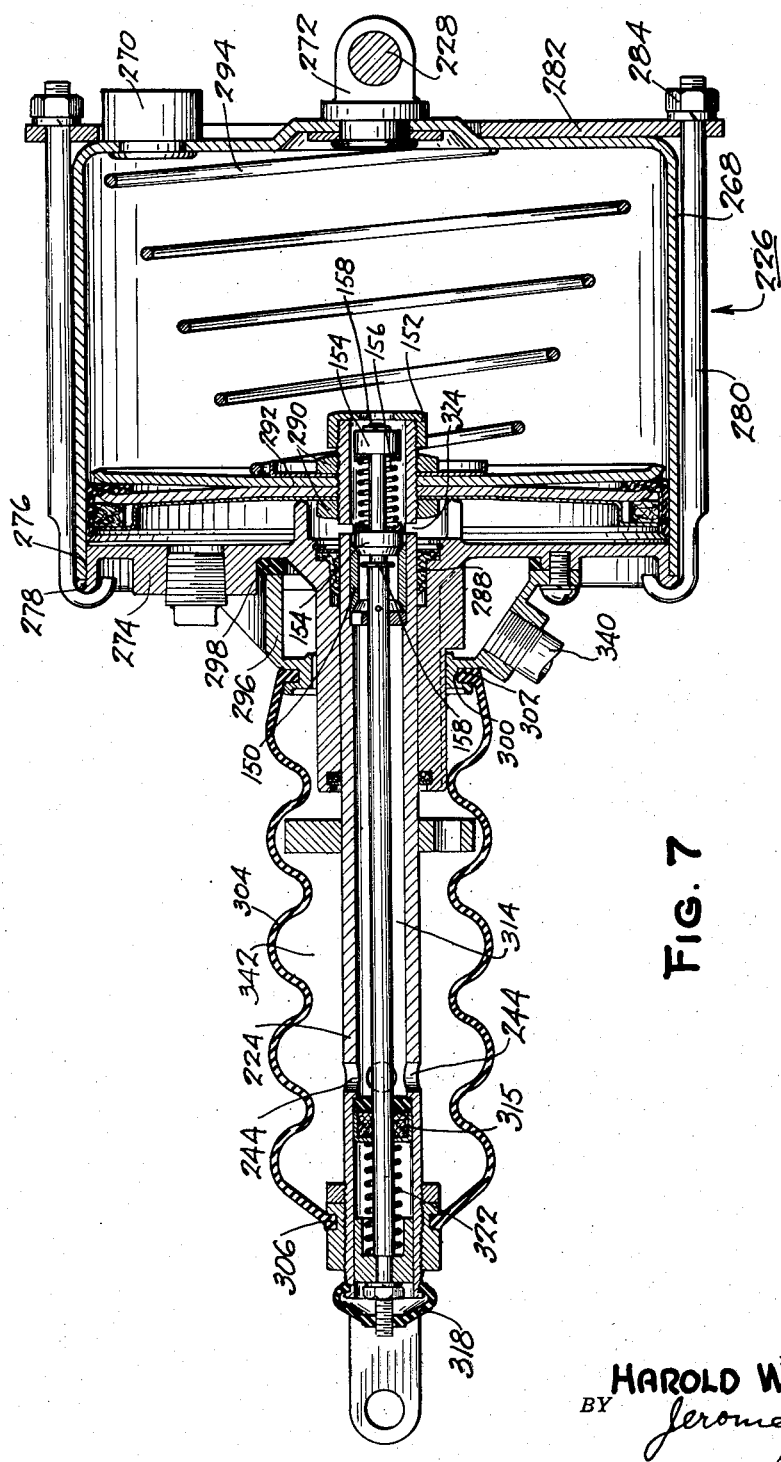
Figure 7 is a longitudinal sectional view of a modification of my novel cylinder.

The modified cylinder of Figure 7 is substantially the same as that just described and corresponding parts have the same reference numerals plus 200. The main difference is that the valve is somewhat modified. A sleeve 150 is pressed into the bore 314 to form one valve seat and a cap 152 having a central aperture is screwed over the end of the piston rod 224 to form another valve seat with the ports 324 between the two seats. A pair of valve members 154 of resilient material are slidably positioned on the valve rod between the two seats and are urged toward seating engagement with the seats by a coiled spring 156 compressed between the inner faces thereof.

A pair of abutments 158 fixed on the valve rod adjacent the outer faces of the valve members are spaced so that in one position both valve members are seated on their respective seats and when the valve rod is moved in one direction or the other, one or the other valve member is lifted from its seat.

It does not seem necessary to describe the operation of this valve and cylinder further in view of the previous description of the cylinder of Figure 2.

While various embodiments of my invention have been described in detail it is not my intention to be limited to those embodiments or otherwise than by the terms of the appended claims.

What I claim is:
1. A brake power cylinder hookup comprising a pivoted pedal, a power lever pivoted on said pedal at one end, a power cylinder having a piston rod connected to the other end of the power lever, brake applying means engaged by the power lever intermediate the ends thereof and closer to the pivotal connection of the lever and pedal, a valve for controlling the power cylinder positioned in the piston rod, a valve rod, and a lever secured fixedly to said pedal and pivotally engaging said valve rod.

2. A brake power cylinder hookup comprising a pivoted pedal, a power lever pivoted on said pedal at one end, a power cylinder having a piston rod connected to the other end of the power lever, brake applying means engaged by the power lever intermediate the ends thereof and closer to the pivotal connection of the lever and pedal, a valve for controlling the power cylinder positioned in the piston rod, a valve rod, and a lever secured fixedly to said pedal and pivotally engaging said valve rod, said valve rod being arranged concentrically in said piston rod and said power lever being forked to receive therebetween the end of the valve lever for engagement with said valve rod.

3. A brake power cylinder hookup comprising a pivoted pedal, a power lever pivoted on said pedal at one end, a power cylinder having a piston rod connected to the other end of the power lever, brake applying means engaged by the power lever intermediate the ends thereof and closer to the pivotal connection of the lever and pedal, a valve for controlling the power cylinder positioned in the piston rod, a valve rod, and a lever secured fixedly to said pedal and pivotally engaging said valve rod, said valve lever and said power lever being provided with springs urging them toward released position.

4. A brake power cylinder hookup comprising a pivoted pedal, a power lever pivoted on said pedal at one end, a power cylinder having a piston rod connected to the other end of the power lever, a hydraulic master cylinder, a piston reciprocable in said cylinder, a piston rod connected to said piston and connected to the power lever intermediate the ends thereof and closer to the pivotal connection of the lever and pedal, a valve for controlling the power cylinder positioned in the power cylinder piston rod, a valve rod for actuating the said valve, and a lever secured fixedly to said pedal and pivotally engaging said valve rod.

5. A brake power cylinder hookup comprising a pivoted pedal, a power lever, a power cylinder having a piston rod connected to one end of the power lever, a pivotal connection between the power lever and the pedal at a point between the pedal pivot and the lever to piston rod connection, brake applying means engaged by the power lever intermediate the ends thereof and closer to the pivotal connection of the lever and pedal, a valve for controlling the power cylinder positioned in the piston rod, a valve rod, and a lever secured fixedly to said pedal and pivotally engaging said valve rod.

6. A brake power cylinder hookup comprising a pivoted pedal lever, a power lever pivoted on said pedal at a point on the opposite side of said pedal lever pivot from the pedal portion of the said pivoted pedal lever, a power cylinder having a piston rod connected to the other end of the power lever, brake applying means engaged by the power lever intermediate the ends thereof and closer to the pivotal connection of the lever and pedal, a valve for controlling the power cylinder positioned in the piston rod, a valve rod for actuating said valve, and a lever pivotal connection between said pedal lever and said valve rod.

HAROLD W. PRICE.